Oct. 2, 1962 E. P. HILDERBRANDT ET AL 3,056,622
MILK CARTON CARRIER AND POURING HANDLE
Filed Jan. 25, 1962
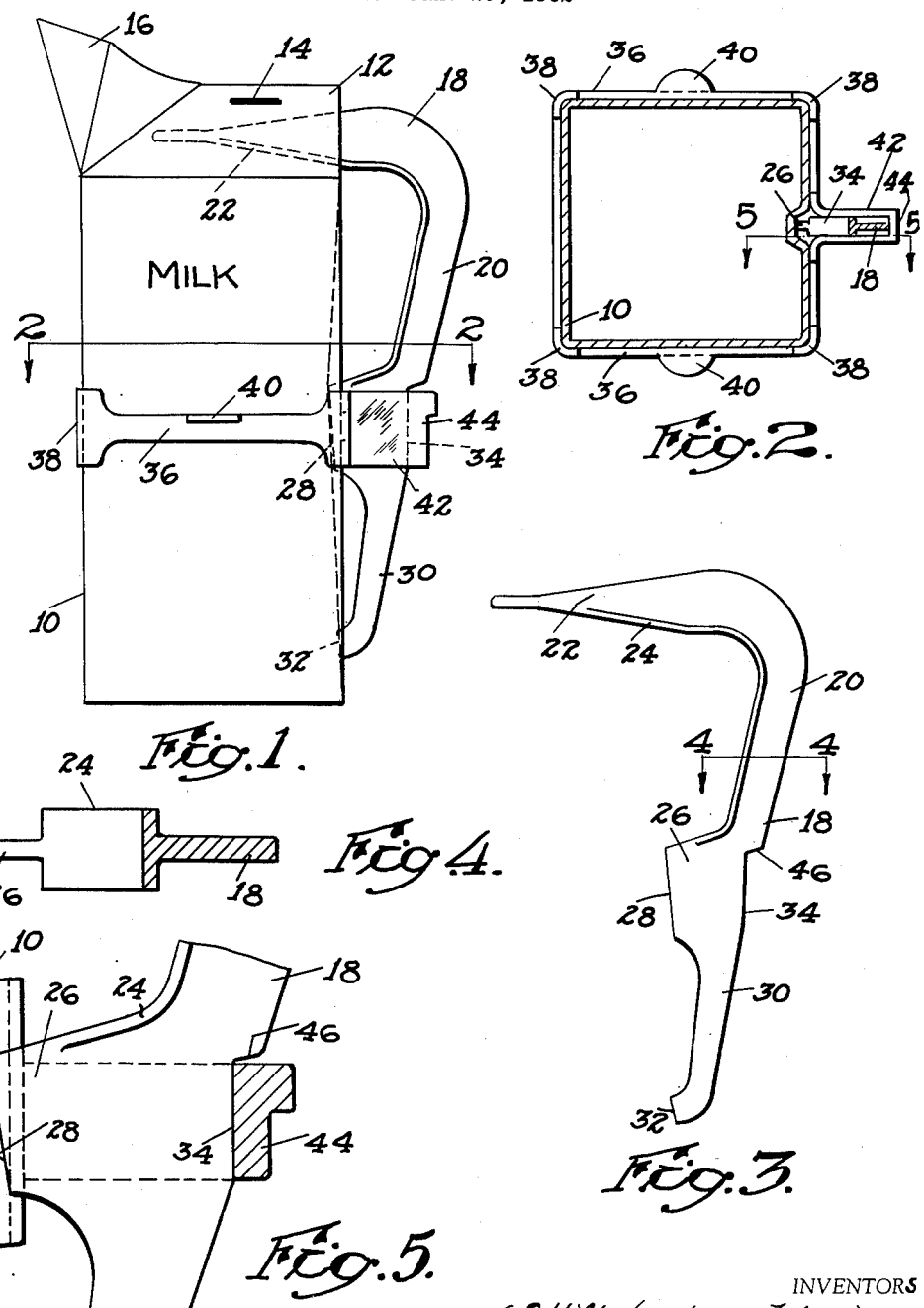
INVENTORS
E. P. Hilderbrandt, S. Jahnrick, +
W. Dylewicz,
BY Charles R. Fay,
ATTORNEY

United States Patent Office 3,056,622
Patented Oct. 2, 1962

3,056,622
MILK CARTON CARRIER AND POURING HANDLE
Edmund Peter Hilderbrandt and Siegfried H. Fahnrich, Clinton, and William E. Dylewicz, Leominster, Mass., assignors to Fun Time Plastics, Inc., Leominster, Mass., a corporation of Massachusetts
Filed Jan. 25, 1962, Ser. No. 168,600
3 Claims. (Cl. 294—31.2)

This invention relates to a new and improved milk carton carrier and pouring handle, and it is the principal object of the invention to provide an inexpensive molded plastic carrier and handle which is positive in operation in that it will not slip or become accidentally detached from the milk carton while carrying the milk carton or while pouring from it.

The objects of the invention include the provision of a two-part carrier or handle of the class described, the parts being wedged together in such a way as to prevent accidental detachment from the carton or from each other, one of said parts being in the form of a generally square open continuous member which is adapted to be disposed about the milk carton at approximately a midway point thereof, and the other of said parts being a co-operating member in the form of a staff or hook having a forwardly projecting portion to insert under the usual triangular shaped closure for the milk carton and having a depending member wedgingly engaged with a certain new and improved portion of said square continuous member as described above together with a forwardly projecting intermediate element which contacts the side wall of the milk carton and is relatively forcefully urged into close association therewith by said new and improved wedging means on the square member, said hook or staff element then depending below said square member and again engaging the milk carton adjacent the lower end thereof, all to the end that the carrier or handle construction is very securely connected to the milk carton for carrying and pouring but may be quickly and easily separated therefrom and is also easily and quickly attached to another milk carton when the first one is exhausted.

The invention further relates to arrangements and combinations of parts which will be hereinafter described and more particularly set forth in the appended claims.

Reference is to be had to the accompanying drawings, in which

FIG. 1 is a view in side elevation illustrating the device in operation;

FIG. 2 is a section on line 2—2 of FIG. 1;

FIG. 3 is a view in elevation illustrating the staff or handle member;

FIG. 4 is an enlarged section on line 4—4 of FIG. 3, and

FIG. 5 is an enlarged section on line 5—5 of FIG. 2.

It is to be understood that the milk carton handle or carrier of the present invention is especially adapted for application to the usual quart or two-quart cardboard milk carton, but the invention is not limited to this use. As is well known, milk cartons as generally indicated at 10 are made of cardboard and are provided at their upper ends with closures which are in the form of a triangular member generally indicated at 12, this triangular member being formed from upwardly extending flaps at the sides of the milk carton secured together by any means such as staple 14. At one end there is an outwardly foldable spout member 16 which is securely tucked in under the closure when not in use but which is easily brought out by thumb and forefinger when it is desired to pour from the carton. This carton construction is of course all old and well known in the art.

The carrier or pouring handle of the present invention is provided by two parts, both of which may be made of plastic and which are inexpensive and light weight. One of the members is a handle member in the form of a staff or hook generally indicated by the reference numeral 18. The portion thereof which is indicated at 20 acts as a handle and just above this handle there is a forwardly projecting elongated nose 22 which as indicated in FIG. 1 is disposable in the triangular closure 12 (see the dotted line showing in FIG. 1). If desired, this portion of the device and also the handle portion may be provided with a rather relatively wide flange 24 which assists in positioning the device and provides against any rocking motion thereof. It will be noticed that the handle member 18 extends out at a right angle centrally of the wall of the milk carton 10.

Below the handle portion 20 this element extends forwardly at 26 terminating in a flat edge 28 which is adapted to engage the side wall of the milk carton as is illustrated in FIG. 1 and then the device recedes along a very narrow depending portion thereof 30 which terminates at its lower end in another flat edge 32 which also engages the wall of the milk carton. Adjacent to the flat edge 28 intermediate the ends of the handle device 18, there is an indented inclined wedging edge 34, the purpose of which will be described.

The other portion of the carrier or handle is an open square or rectangular endless member generally indicated at 36. This may be of many different shapes and sizes but preferably is provided with reenforced corner portions as shown and also with fingerholds 40, 40 to assist in applying it to the carton and removing it therefrom. At one side of the device 36 it extends outwardly in a flat loop at 42 to accommodate the central portion at 26 of the handle portion 18, and is provided with a relatively solid rear bearing portion which is indicated at 44, this having an inner relatively angled edge more or less complementary to that at 34, it being noted for instance in FIG. 5 that the edge at 34 provides a shoulder 46.

In the use of the device, the handle portion 18 is applied to the milk carton at a side thereof by placing the nose portion 18 inside the triangular closure, and this generally positions the handle where desired but does not secure it.

The square member 36 is then slid onto the milk carton from the bottom with the portion at 42 aligned with the handle member which receives it when the square member 36 arrives substantially at the position shown in FIG. 1. In this condition of the parts, the edge 34 is wedged tightly against the inner edge of the member 44, and by this means the surface at 28 as well as the surface at 32 are forcefully moved as for instance to the left in FIG. 1, this being a kind of camming action. The result is that the edge at 28 impinges strongly on the side wall of the carton and even distorts it inwardly slightly as shown in FIGS. 1 and 2 providing an extremely tight solid milk carton carrier or pouring handle member which will not become loose or accidentally fall off but which is nevertheless easily removable and replaceable.

Having thus described our invention and the advantages thereof, we do not wish to be limited to the details herein disclosed, otherwise than as set forth in the claims, but what we claim is:

1. A carrier and pouring handle for a milk carton comprising a generally square open continuous member receiving the milk carton therein, an outwardly extending projection on said member at one side thereof, said projection forming a flat loop communicating with the interior of the square member, and a separate handle member, said handle member having a main handle portion, a forwardly projecting nose portion at an end thereof, a forwardly projecting intermediate portion having a milk carton-abutting edge, said intermediate portion being receivable in the loop, and interengaging cooperating means in the loop and on the handle member forcing said carton-abutting edge inwardly of the square member toward and lightly deforming a contacted wall of the milk carton providing for a tight but releasable connection between the square member and the handle member on the milk carton.

2. In the carrier and pouring handle of claim 1, said nose extending in spaced relation to but at the same side of the handle member as the intermediate portion, said nose being engageable with a closure part of the milk carton.

3. In the carrier and pouring handle of claim 1, said nose extending in spaced relation to but at the same side of the handle member as the intermediate portion, said nose being engageable with a closure part of the milk carton, and a foot on the handle member at the opposite end from the nose, the foot engaging the wall of the milk carton contacted by the carton-abutting edge of the intermediate portion of the handle member.

References Cited in the file of this patent

UNITED STATES PATENTS

| | | |
|---|---|---|
| 2,871,051 | Nesslein | Jan. 27, 1959 |
| 2,976,074 | Weinar | Mar. 21, 1961 |